3,318,656
BLEACHING OF TETRAFLUOROETHYLENE FILAMENTS
Norman C. Jeckel, Glens Falls, N.Y., assignor to United States Catheter & Instrument Corporation, Glens Falls, N.Y., a corporation of New York
No Drawing. Continuation of application Ser. No. 238,071, Oct. 31, 1962. This application Dec. 20, 1965, Ser. No. 515,211
12 Claims. (Cl. 8—101)

This application is a continuation of my co-pending application, Ser. No. 238,071, filed Oct. 31, 1962, now abandoned, which was a continuation-in-part of my co-pending application, Ser. No. 752,370, filed July 31, 1958, now abandoned.

This invention relates to new and useful improvements in the bleaching of tetrafluoroethylene filaments and is more particularly concerned with bleaching medical prosthetic devices made from such filaments.

"Teflon" (Du Pont trademark for tetrafluoroethylene resin) in its solid form is white but acquires a small percentage of impurities when made into yarn or fiber due to high temperature involved which makes it dark brown. These brown fibers have less tissue reactivity than "Dacron" (Du Pont trademark for polyethylene glycol terephthalate) or nylon but somewhat more than purified white Teflon. Therefore, from the aspect of reactivity and also for appearance, it is preferable to have purified (bleached) white Teflon as the material from which artificial blood vessels, sutures, catheters, or other surgical devices are made. The various advantages of Teflon and the white purified Teflon for these purposes have been set forth by Harrison in 95 American Journal of Surgery 3 (1958) and need not be further discussed at this point.

As pointed out by Harrison, his purified Teflon grafts were boiled for 24 hours in each of concentrated $HNO_3$, concentrated $H_2SO_4$, 50% NaOH, and aqua regia. This treatment has been shortened by others to boiling for 10 to 20 hours in a mixture of concentrated $HNO_3$ and $H_2SO_4$. However, this is still an expensive and time-consuming process, particularly when dealing with hot concentrated acids.

It is an object of this invention to provide an improved method for purifying Teflon filaments.

It is an additional object of this invention to provide a greatly shortened process for purifying and bleaching Teflon filaments.

It is a further object of this invention to provide a bleached white Teflon fabric desirable for surgical and medical use.

I have found that brown Teflon filaments alone or in a fabric can be bleached to the desirable purified white Teflon by boiling for a relatively short period in a mixture of sulfuric, nitric and perchloric acid (lower temperatures take longer time).

With the above objects and others in view, the nature of which will be more apparent, the invention will be more fully understood by reference to the accompanying detailed description and the appended claims.

As pointed out hereinbefore brown Teflon may be used in surgical applications but it is apparent that purified or white Teflon is the preferred material to be used in producing blood vessel grafts, sutures, etc. After forming a Teflon tube as a blood vessel graft (e.g. my copending application, Ser. No. 520,032, filed Dec. 20, 1965) by knitting (preferably), weaving, or braiding, the brown tube is treated in a solution of 1 part concentrated $HNO_3$, 1 part concentrated $H_2SO_4$, and 2 parts $HClO_4$ (70%) for about one-half hour, during which the solution is brought to a boil at about 285° F. and heating continued to raise the boiling point to about 375° F. At this point 1 part $HClO_4$ is again added to the boiling solution and the treatment continued for another half hour. This second addition of $HClO_4$ is not necessary but has been found to quicken the bleaching process.

At the end of this one-hour treatment, the Teflon is generally white. If it is still tan, the treatment is continued until the Teflon is white, the time depending somewhat on the size of the filaments, tightness in the tube, etc. If the treatment continues past an hour, more $HClO_4$ may be added to aid the process.

Various relative amounts of the three acids may be used as long as all are present but the 1:1:2 mixture has been found to give the quickest results. If less concentrated acids are used, they will become concentrated during the boiling treatment. For safety purposes, the conventional 60 or 70% $HClO_4$ is used. The primary value of the $H_2SO_4$ is believed to be its high boiling point which thus permits the $HNO_3$ and $HClO_4$ to react with the Teflon at higher temperatures. Therefore, an essential aspect of the invention is treatment of the Teflon at a temperature range of above 285° F. For practical reasons, I do not generally go above 375° F. In fact, bleaching will occur if a mixture of $HNO_3$ and $HClO_4$ is added dropwise to $H_2SO_4$. Any relative quantities of the three acids cause bleaching but it is convenient to have substantial amounts of each. When the mixture is being heated, it is obvious, of course, that $HNO_3$ and $HClO_4$ will boil away, leaving $H_2SO_4$. Thus the former two must be replenished to maintain a given ratio. I add the Teflon to the cold acid mixture but the bleaching is much more rapid at the higher temperatures and the Teflon may be added after the mixture is hot, if desired.

Although I prefer to bleach the Teflon tube after the filaments have been interlaced by knitting, braiding, or weaving, the filament can be bleached before making the tube. When the formed tube is bleached, heat shrinkage will also occur and reduce the porosity of the tube. I have found it desirable to first form the Teflon tube with brown filaments, then bleach the tube, then corrugate the tube and thereafter quickly treat the tube again in the boiling acid bleaching mixture. Knitted surgical meshes, sutures and any other medical or industrial items formed from Teflon filaments may obviously be similarly treated.

I claim:

1. A process for bleaching polytetrafluoroethylene filaments comprising treating said filaments with a mixture of sulfuric, nitric and perchloric acids.

2. A process as claimed in claim 1 wherein said acid mixture is heated to above 285° F. during said theatment.

3. A process as claimed in claim 2 wherein said acid mixture is heated to boiling during said treatment.

4. A process as claimed in claim 3 wherein said nitric and sulfuric acids are concentrated and said perchloric acid is 60 to 70%.

5. A process as claimed in claim 4 wherein the ratio of acids in said mixture is 1 part sulfuric, 1 part nitric and 2 parts perchloric.

6. A process as claimed in claim 4 wherein said perchloric acid is 70%.

7. A process as claimed in claim 6 wherein said mixture has an initial boiling point of about 285° F. and the treatment is continued until the boiling point reaches about 375° F.

8. A process as claimed in claim 3 wherein the ratio of acids in said mixture is such that it boils initially at about 285° F.

9. A process as claimed in claim 8 wherein said treatment is continued until the boiling point reaches about 375° F.

10. A process as claimed in claim 9 wherein additional perchloric acid is added after the boiling point reaches about 375° F.

11. The process of claim 4 wherein said filaments form a blood vessel graft prior to said treatment.

12. The process of claim 4 wherein said filaments form a surgical mesh prior to said treatment.

No references cited.

NORMAN G. TORCHIN, *Primary Examiner.*

J. H. RAUBITSCHEK, *Assistant Examiner.*